United States Patent [19]
Winkler

[11] Patent Number: 5,457,506
[45] Date of Patent: Oct. 10, 1995

[54] RETAINER FOR NOSE PADS ON AN EYEGLASS FRAME

[75] Inventor: Rolf Winkler, Eisingen, Germany

[73] Assignee: F & W Frey Winkler GmbH, Konigsbach-Stein, Germany

[21] Appl. No.: 224,551

[22] Filed: Apr. 7, 1994

[30] Foreign Application Priority Data

Feb. 1, 1994 [DE] Germany ............... 44 02 983.7

[51] Int. Cl.⁶ .................................................. G02C 5/12
[52] U.S. Cl. ............................................. 351/137; 351/136
[58] Field of Search ................................ 351/76, 78, 80, 351/136, 137, 138, 139

[56] References Cited

U.S. PATENT DOCUMENTS

| 1,808,448 | 6/1931 | Baker | 351/137 |
| 4,681,411 | 7/1987 | Taddei | 351/138 X |
| 4,904,076 | 2/1990 | Kappler et al. | 351/138 |

FOREIGN PATENT DOCUMENTS

| 2492545 | 4/1982 | France |  |
| 2835116 | 2/1980 | Germany |  |
| 2712897 | 9/1981 | Germany |  |
| 2732860 | 10/1981 | Germany |  |
| 3303749 | 8/1984 | Germany | 351/136 |

Primary Examiner—William L. Sikes
Assistant Examiner—David R. Parsons
Attorney, Agent, or Firm—Spensley Horn Jubas & Lubitz

[57] ABSTRACT

A retainer for securing a nose pad on an eyeglasses frame, the retainer being composed of a flat, one-piece pad arm having a receiving opening in the form of an elongated hole, and a retaining element of plastic secured to the nose pad, the retaining element having a constriction and being receivable in the receiving opening of the pad arm to be locked in the receiving opening by engagement of the constriction in the opening. The pad arm is a bilaterally symmetrical structure having a first end in which the opening is formed, is made of material which extends continuously around the opening and is substantially inelastic around the opening. The opening cross section of the elongated hole is selected and the retaining element is formed such that when the constriction engages in the receiving opening, a transition surface of the retaining element is engageable with the pad arm for allowing the retaining element and the nose pad to be pivotable and tiltable relative to the pad arm.

18 Claims, 4 Drawing Sheets

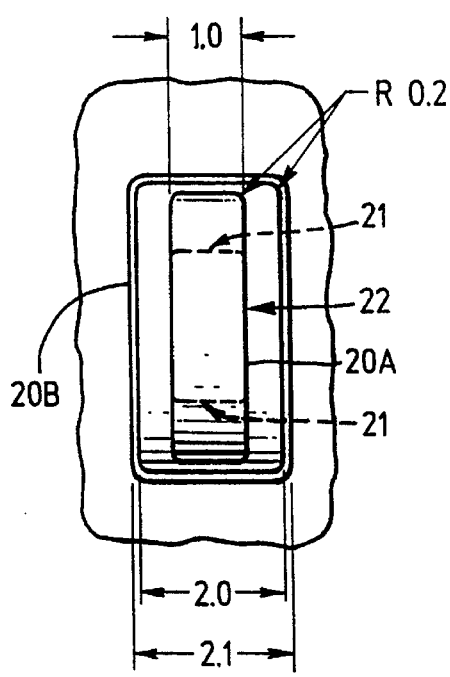
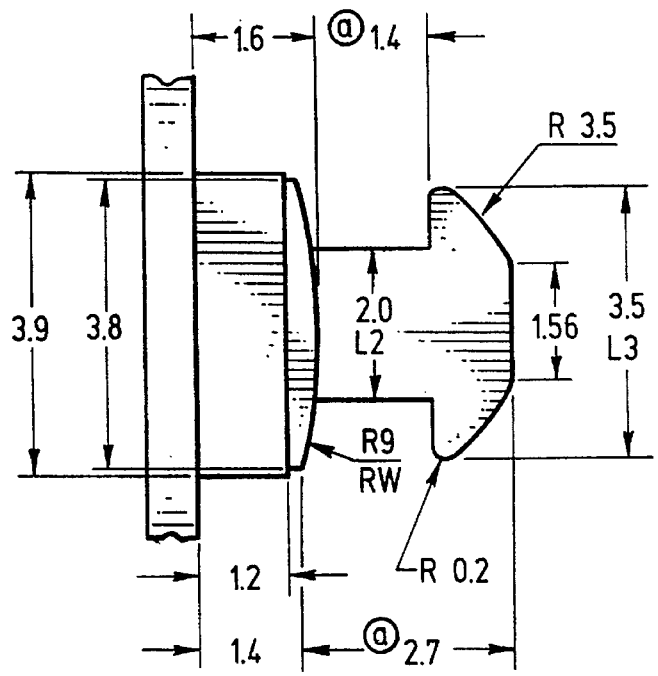
FIG. 7  FIG. 8
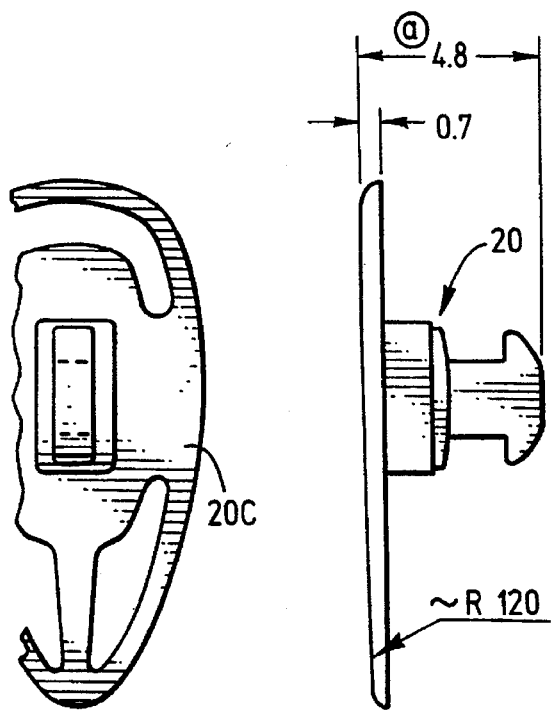
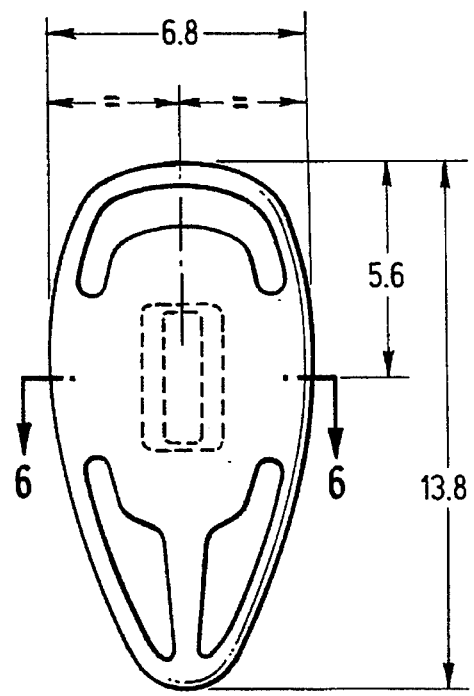
FIG. 9   FIG. 10   FIG. 11

RETAINER FOR NOSE PADS ON AN EYEGLASS FRAME

BACKGROUND OF THE INVENTION

1. Field of the Invention

The present invention relates to a retainer for a nose pad on a frame of a pair of eyeglasses, the pair of eyeglasses being composed of two frames, each holding a lens, and a member, such as a bridge, connecting the frames together. A respective nose pad is secured to each frame. Each such retainer consists of a flat, one-piece nose pad support, or pad arm, and of a plastic retaining element for the nose pad. The retaining element can be inserted into a receiving opening of the nose pad support and locked therein by engagement of the nose pad support with a constriction of the retaining element.

2. Prior Art

Retainers of this type are known in many structural designs, all of which have in common that, on the one hand, the nose pad support, or pad arm, which can be fixed on one of the eyeglasses frames, and, on the other hand, the nose pad can be brought into engagement with each other by means of essentially correspondingly shaped parts or partial sections, so that a more or less permanent connection of these components, which is essential for the wearing properties of the eyeglasses, is achieved.

Examples of such retaining mechanisms are disclosed in German Letters Patents DE-PS 27 32 860 and DE-PS 27 12 897 and German Published, Non-Examined Patent Application DE-OS 28 35 116.

French Patent Publication FR-A 2 492 545 which relates to this type of structure, also discloses such a system.

Connecting the nose pads to the pad arm is considerably difficult since, because of the small dimensions of the components concerned which are in the millimeter range, the definition of the forces and stresses on the material when the retaining element is snapped in or pulled out of the pad arm and their translation into concrete dimensional structures can quickly lead to unsatisfactory results, if it is not possible to achieve an optimum structural adaptation. This may be the reason why the systems disclosed in the above mentioned patent publications have not been successful in the marketplace in spite of their basic functional abilities.

The requirement for as simple as possible and therefore cost-effective manufacture and processing of the components does not take second place to the requirement for perfect and satisfactory functioning of these components, even in case of constant stresses, which should also aid the comfortable wear of the eyeglasses. For example, the solutions of German Letters Patent DE-PS 28 35 116 are unacceptable because there the pad arm consists of two separate parts which as a rule must be soldered together. Therefore, a separate process step is required here, which even with the most careful work necessarily will produce unsatisfactory soldered connections. This, in turn, leads to a considerable amount of waste because of the breaking of the soldered connection between the pad arm and the separately manufactured retainer box. Although such waste is only on the order of 0.5 to 1% of the total production, the end result is that in case of complaints about defective connections (broken-off pads) of eyeglasses, as a rule the entire pair of eyeglasses becomes unusable because with most eyeglass models the repair costs are more on the order of the value of the entire eyeglasses than on the order of the value of the pad arm with the box soldered on. Therefore the mentioned waste leads to an over-proportional value loss in spite of the numerically small proportion in the sense that the resulting damage is far above the value of the defective components as such. Again and again this results in complaints and difficulties with customers.

This situation is improved by the solution disclosed in French Patent Publication FR-A-2 492 545 in that there a profiled wire or the like is used as the pad arm or at least as a part of the pad arm, which results in a simplification.

However, this reference and all other above mentioned references have in common that the objective of such a connection between the pad arm on the one hand and the nose pad on the other consists in achieving simple assembly as well as simple disassembly of these two parts. Thus, it is to be made possible for the optometrist to pull a possibly damaged or aged nose pad out of the pad arm without the use of tools and to replace it with a new component.

This objective may be the reason why the known solutions have attempted to achieve the resilience required for this in that either the retaining section of the nose pads or the receiving section of the pad arm (or both, as in FR-A-2 492 545) have slits for achieving suitable pressing together or widening during assembly and disassembly.

With the dimensions in the millimeter range mentioned above, together with the unavoidable manufacturing tolerances, however, these slits lead to an inadequate definition of the engagement and disengagement properties of the nose pad, since obviously they further increase the tolerances present as such because of the manufacture of the components. The result of these inadequacies is then reflected in unsatisfactory functioning, either in that the desired assembly and disassembly behavior in actual use is stiffer than planned, or that the connection is too loose, so that even though the connection of the two components is satisfactory, the danger of unintentional loss of a nose pad increases over-proportionally.

SUMMARY OF THE INVENTION

Therefore, an essential object of the invention is to provide a nose pad retainer of the type described above which assures a secure, but simultaneously movable, fixation of the nose pad on the pad arm within defined limits.

The above and other objects are achieved in accordance with the invention by a retainer for securing a nose pad on an eyeglasses frame, the retainer comprising: a flat, one-piece pad arm having a receiving opening; and a retaining element of plastic secured to the nose pad, the retaining element having a constriction and being receivable in the receiving opening of the pad arm to be locked in the receiving opening by engagement of the constriction in the opening, wherein:

the pad arm is a bilaterally symmetrical structure having a first end in which the opening is formed;

the pad arm is made of material which extends continuously around the opening;

the pad arm is substantially inelastic around the opening;

the pad arm has a thickness not greater than 1.1 mm around the opening;

the receiving opening has the form of an elongated hole having an opening cross section;

the retaining element is made of an elastically deformable plastic material having an essentially one-piece, mushroom-shaped front section which includes the constriction and an enlarged head, the constriction having a first cross section, an essentially one-piece rear section having a second cross section which is larger than the first cross section, and a transition surface between the front section and the rear section;

the transition surface between the front and rear sections is arched toward the front section; and the opening cross section of the elongated hole, the first and second cross sections and the arched form of the transition surface are selected such that when the constriction engages in the receiving opening, the transition surface is engageable with the pad arm for allowing the retaining element and the nose pad to be pivotable and tiltable relative to the pad arm.

An essential basic concept of the invention consists in that the pad arm as well as the retaining element of the nose pad each have an essentially continuous cross section, i.e. are not given a slit for providing play for assembly and disassembly.

Thus, the invention proceeds from the concept that, if necessary, removal of the nose pad can also be achieved by destroying the mushroom-shaped front section of the retaining element, for example by pinching it off by means of suitable pliers. This represents only a small disadvantage since, as already mentioned above, the cost of a nose pad as such is minimal. But the relinquishment of a non-destructive disassembly of the nose pad does provide the requirements which essentially increase the dependability and operability of the retainer.

The construction of the pad arm made of mostly inelastic (for example metallic) material in a completely closed design allows a very precise manufacture from, for example, a round metal profile section by pressing and precision stamping, so that a dimension determined once here can be maintained with the smallest tolerances, even when producing several thousand pieces, since no widening as in the slitted versions is provided.

This applies correspondingly to the retaining element which is also unslitted, but is made of plastic. The requirements on the shape and elastic properties of the plastic can also be set within very narrow limits here, since it need only be required to provide the possibility of problem-free insertion of the retaining element into the pad arm and engagement therein. Therefore, a relatively hard plastic can also be used here for the retaining element, so that the retaining element can also be made of one piece with the nose pad as such or with a core contained in the nose pad.

On the other hand, this relatively hard plastic material also makes possible the defined embodiment of the transition surface between the two sections of different cross section, which itself determines the "dynamic" behavior of the nose pad, namely its tilt and pivot range.

The predeterminable options regarding the dimensions and properties of the material described in detail above lead to minimal production tolerances in mass production and thus to constant wearing properties.

Further embodiments of the invention will be described below.

A preferred exemplary and non-limiting embodiment will now be described with reference to the drawings.

BRIEF DESCRIPTION OF THE DRAWING

FIGS. 7 and 8 are detail views of the retaining element of FIG. 5, with exemplary dimensions in millimeters being shown.

FIGS. 9, 10 and 11 are, respectively, a partial side view from one side, a front view and a side view from the opposite side of a retaining element according to the invention which includes a core.

DESCRIPTION OF THE PREFERRED EMBODIMENTS

Figure 1:
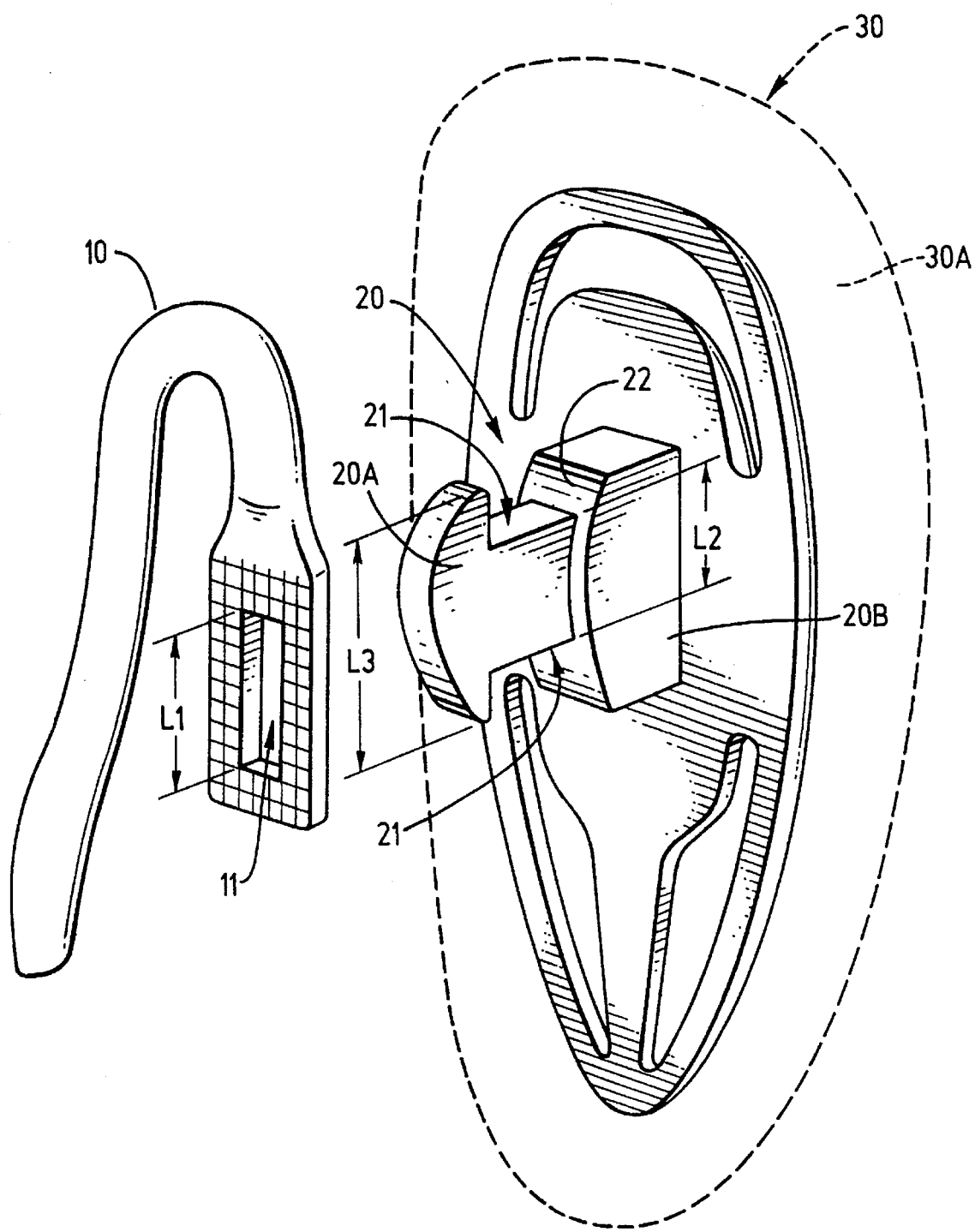
FIG. 1 is a perspective total view of an embodiment of a retainer for a nose pad in accordance with the invention in a disassembled state.
Figure 2:
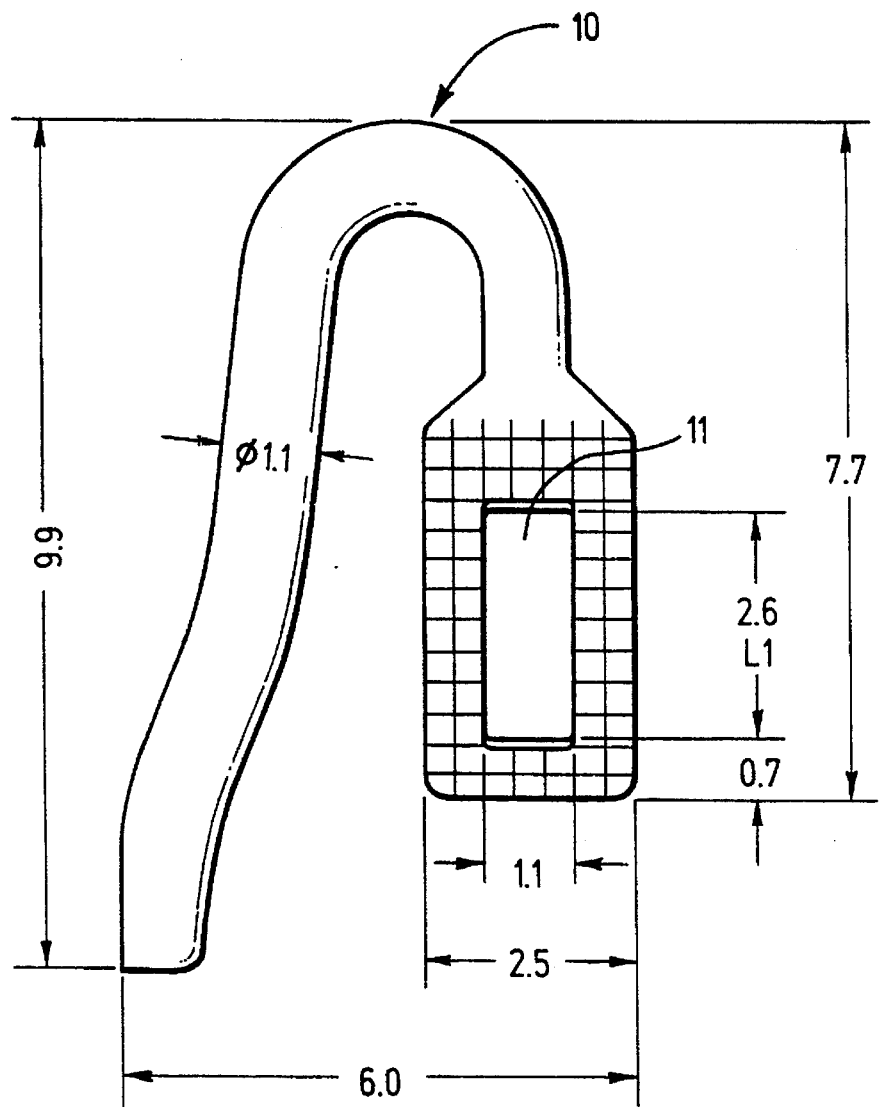
FIGS. 2 and 3 are respectively a side elevational and bottom plan view of the pad arm of the embodiment of FIG. 1, with exemplary dimensions in millimeters being shown.
Figure 3:
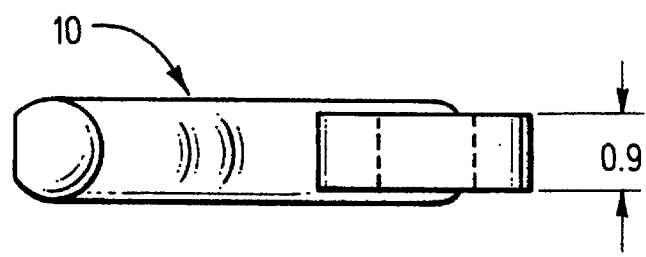
Figure 4:
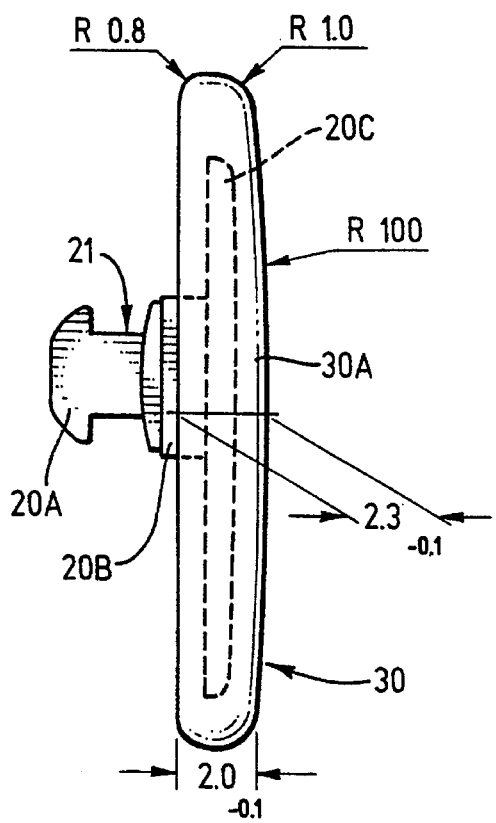
FIGS. 4, 5 and 6 are, respectively, a front elevational view, a side elevational view and a cross-sectional view, of the retaining element with a nose pad core, with exemplary dimensions in millimeters being shown. The cross-sectional view of FIG. 6 is taken along line 6—6 of FIGS. 5 and 11.
Figure 5:
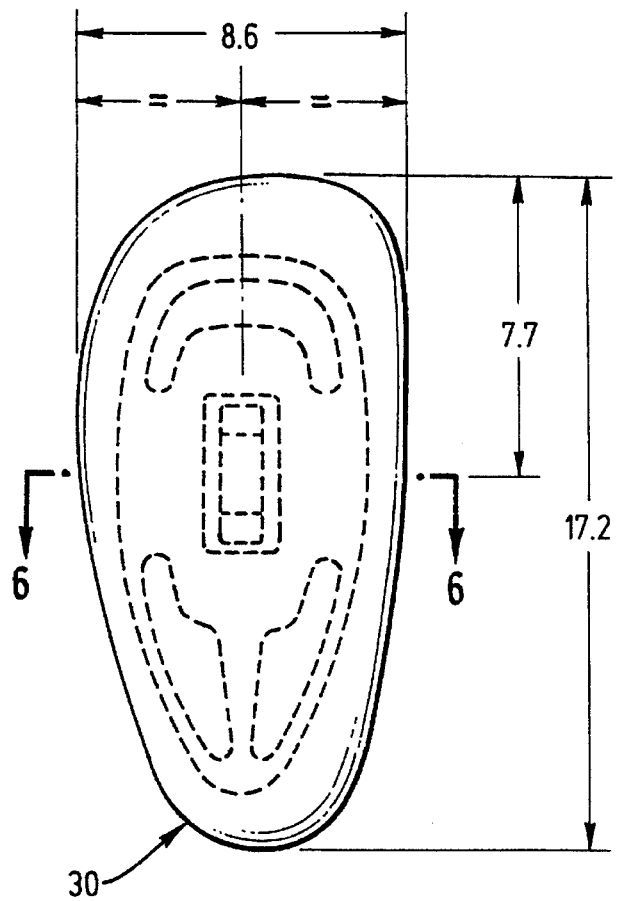
Figure 6:
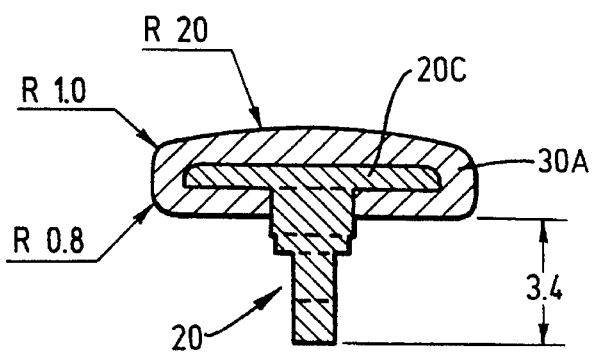

FIG. 1 illustrates an embodiment of a retainer according to the invention which includes a pad arm 10 formed of a metal wire, pad arm 10 also being shown in FIGS. 2 and 3. Pad arm 10 has a nose pad end which has been pressed to a thickness of 0.9 mm (FIG. 3) and a width of approximately 2.5 mm (FIG. 2). A receiving opening is formed in the nose pad end as an elongated hole 11 having a length L1 of 2.6 mm and a width of 1.1 mm.

The opposite end of pad arm 10 will be permanently fixed to a frame of a pair of eyeglasses, as by soldering, brazing, welding or cementing, or by a mechanical fastener such as a screw.

It will be noted, particularly from FIG. 3, that pad arm 10 is perfectly symmetrical relative to a median plane so that identical pad arms can be mounted on both frames of a pair of eyeglasses.

In the exemplary embodiment illustrated, the retaining element 20 is made in one piece with a core 20C embedded in a nose pad 30 which comprises a covering sheath 30A of a soft plastic made of a material, such as silicon, which is well tolerated by the skin. However, according to the invention, retaining element 20 and nose pad 30 may be fabricated as a one-piece unit which would have the same external form as the illustrated embodiment.

The retaining element 20 is essentially divided into two sections:

An unslitted, mushroom-shaped front section 20A, composed of a stem portion and an enlarged head, with the stem portion defining a constriction 21, and a rear section 20B, which has a larger cross section than the first section 20A. Suitable dimensions for this can be found in FIGS. 7 and 8 in particular. The stem portion, where constriction 21 is provided, has a width, or height, L2, parallel to the length L1 of hole 11, and the enlarged head has a width, or height, L3 in the same direction as L2.

A transition surface 22, which is arched away from nose pad 30 and toward section 20A, forms the transition between these two sections of different cross section. Only a one-dimensional arching is shown in the illustrated exemplary embodiment, however, it is also possible to provide an arch in the shape of a section of a spherical surface.

Mounting, or installation, of the retaining element 20 in the elongated hole 11 of the pad arm 10 is performed in such a way that first a "corner" of the mushroom-shaped front section is pushed through elongated hole 11, in which case the nose pad is in a position which is pivoted with respect to the position shown in FIG. 1. Then, with deformation of the front mushroom section, the other part is pressed into the elongated hole 11, so that during this process the two ends, or corners, of the mushroom-shaped section are being stressed in opposite directions.

In the mounted position, constriction 21 engages in receiving opening 11 so that receiving opening 11 is positioned between the enlarged head and the transition surface of retaining element 20. The pad arm 10 can then slide along the constriction 21 of the front section 20A, i.e. along the length of the stem of the mushroom shape, in which case the transition surface 22 is used as a stop, where as a rule the nose pad is located in the wearing position, as well as a "roll-off surface", where the nose pad is supported on the pad arm and on which it is continuously pivotable and tiltable over the predetermined range.

Further structural details can be taken from the drawings, in which a particularly preferred embodiment is shown with exemplary indicated dimensions.

As illustrated in the drawing, preferred embodiments of the invention may have the following structural features:

the length (L1) of elongated hole 11 may exceed the width (L2) of constriction 21 by 20% to 50%;

the opening cross-sectional area of elongated hole 11 may exceed the cross-sectional area of constriction 21 by 20% to 60%;

a combination of the following dimensions may be employed:
elongated hole 11 is 2.6 mm long (L1) and 1.1 mm wide,
the cross section of constriction 21, in a plane parallel to the opening cross-sectional area of hole 11, is 2.0 mm (L2) ×1.0 mm, and
the enlarged head of front section 20A has a width, or height, parallel to the length of elongated hole 11, not greater than 3.8 mm;

transition surface 22 may have a radius of curvature of between 5 and 20 mm, and preferably substantially 9 mm; and retaining element 20 may be of a material having an indentation hardness of 90 to 120, according to DIN 53456.

As indicated earlier herein, embodiments of a retainer in accordance with the invention may be fabricated by making retaining element 20 and nose pad 30 in one piece since both parts can be made of material having the same physical characteristics.

This application relates to subject matter disclosed in German Application number P 44 02 983.7, filed on Feb. 1, 1994, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A retainer for securing a nose pad on an eyeglasses frame, said retainer comprising: a flat, one-piece pad arm having a receiving opening which defines a passage that extends in a first direction, said pad arm having a thickness in the first direction; and a retaining element of plastic secured to the nose pad, said retaining element having a constriction and being receivable in said receiving opening of said pad arm to be locked in said receiving opening by engagement of said constriction in said opening, wherein:

said pad arm is a bilaterally symmetrical structure having a first end in which said opening is formed;

said pad arm is made of material which extends continuously around said opening;

said pad arm is substantially inelastic around said opening;

the thickness of said pad arm is not greater than 1.1 mm around said opening;

said receiving opening has the form of an elongated hole having an opening cross section in a plane perpendicular to the first direction;

said retaining element is made of an elastically deformable plastic material having an essentially one-piece, mushroom-shaped front section which includes said constriction and an enlarged head, said constriction having a first cross section, an essentially one-piece rear section having a second cross section which is larger than said first cross section, the first and second cross sections being in respective planes parallel to the plane of the opening cross section and a transition surface between said front section and said rear section; said transition surface between said front and rear sections is arched toward said front section; and said opening cross section of said elongated hole, said first and second cross sections and the arched form of said transition surface are selected such that when said constriction engages in said receiving opening, said transition surface is engageable with said pad arm for allowing said retaining element and the nose pad to be pivotable and tiltable relative to said pad arm.

2. A retainer in accordance with claim 1, wherein said elongated hole has a length (L1) in the plane of the opening cross section and said constriction has a width, parallel to the length, and the length of said elongated hole exceeds the width (L2) of said constriction by 20% to 50%.

3. A retainer in accordance with claim 2 having the following dimensions:

a. said opening cross section is 2.6 mm long and 1.1 mm wide, b. said first cross section, of said constriction, is 2.0×1.0 mm, and c. said enlarged head of said front section has a width, parallel to the length of said opening cross section, not greater than 3.8 mm.

4. A retainer in accordance with claim 1, wherein the opening cross section of said elongated hole of said pad arm has a first area, the first cross section of said constriction has a second area, and the first area is 20% to 60% larger than the second area.

5. A retainer in accordance with claim 4 having the following dimensions:

a. said opening cross section is 2.6 mm long and 1.1 mm wide, b. said first cross section, of said constriction, is 2.0×1.0 mm, and c. said enlarged head of said front section has a width, parallel to the length of said opening cross section, not greater than 3.8 mm.

6. A retainer in accordance with claim 1, wherein when said constriction engages in said receiving opening, said elongated hole is positioned between said enlarged head and said transition surface of said retaining element.

7. A retainer in accordance with claim 6 having the following dimensions:
   a. said opening cross section is 2.6 mm long and 1.1 mm wide,
   b. said first cross section, of said constriction, is 2.0×1.0 mm, and
   c. said enlarged head of said front section has a width, parallel to the length of said opening cross section, not greater than 3.8 mm.

8. A retainer in accordance with claim 1 having the following dimensions:
   a. said opening cross section is 2.6 mm long and 1.1 mm wide,
   b. said first cross section, of said constriction, is 2.0×1.0 mm, and
   c. said enlarged head of said front section has a width, parallel to the length of said opening cross section, not greater than 3.8 mm.

9. A retainer in accordance with claim 1, wherein said transition surface has a radius of curvature of between 5 and 20 mm.

10. A retainer in accordance with claim 9, wherein the radius of curvature of said transition surface is substantially 9 mm.

11. A retainer in accordance with claim 1, wherein said retaining element and the nose pad are of one piece.

12. A retainer in accordance with claim 11, wherein said retaining element has an indentation hardness of 90 to 120 according to DIN 53456.

13. A retainer in accordance with claim 1, wherein said retaining element is a one-piece structure which further comprises a core inside the nose pad and the nose pad includes an external sheath of a soft plastic material which is well tolerated by the skin.

14. A retainer in accordance with claim 13 wherein the sheath is made of silicon.

15. A retainer in accordance with claim 14, wherein said retaining element has an indentation hardness of 90 to 120 according to DIN 53456.

16. A retainer in accordance with claim 13, wherein said retaining element has an indentation hardness of 90 to 120, according to DIN 53456.

17. A retainer in accordance with claim 1, wherein said pad arm consists of a metal wire.

18. A retainer in accordance with claim 17, wherein said metal wire is composed of stainless steel or German silver.

\* \* \* \* \*